(No Model.)

J. S. CHACE.
THRUST BEARING FOR WHEELS, &c.

No. 518,393. Patented Apr. 17, 1894.

Witnesses:
Walter E. Lombard
Geo. E. Mitchell

Inventor:
James S. Chace,
by N. C. Lombard
Attorney.

UNITED STATES PATENT OFFICE.

JAMES S. CHACE, OF BROCKTON, ASSIGNOR OF TWO-THIRDS TO GEORGE M. CARPENTER, OF EVERETT, AND FRANK W. SISSON, OF FAIR HAVEN, MASSACHUSETTS.

THRUST-BEARING FOR WHEELS, &c.

SPECIFICATION forming part of Letters Patent No. 518,393, dated April 17, 1894.

Application filed October 21, 1893. Serial No. 488,798. (No model.)

*To all whom it may concern:*

Be it known that I, JAMES S. CHACE, of Brockton, in the county of Plymouth and State of Massachusetts, have invented a new and useful Improvement in Thrust-Bearings for Wheels, Shafting, and other Revolving Objects, of which the following, taken in connection with the accompanying drawings, is a specification.

My invention relates to thrust bearings for wheels, shafts or other revolving objects and it consists in certain novel features of construction, arrangement and combination of parts which will be readily understood by reference to the description of the drawings, and to the claims at the end of this specification in which my invention is clearly pointed out.

Figures 2, 3, 4:
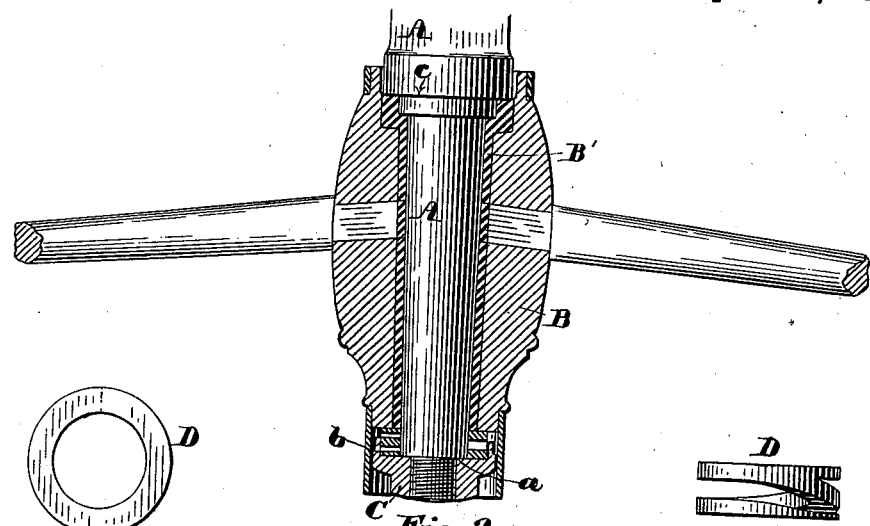
Figure 1:
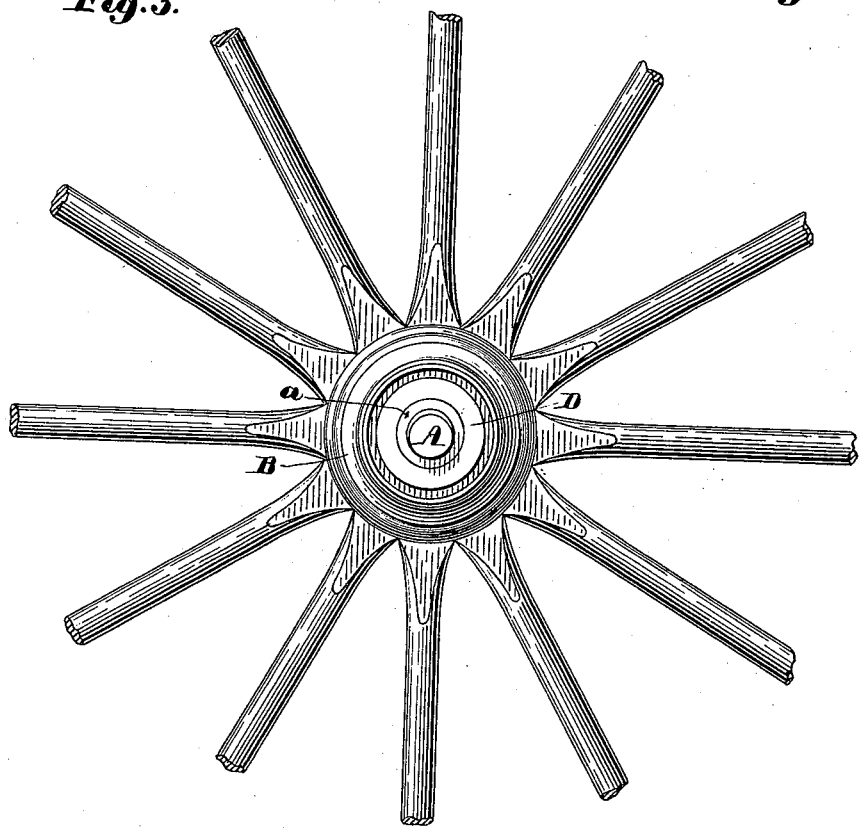

Figure 1 of the drawings is an end elevation of the hub of a carriage wheel and its axle with the nut removed and illustrating my invention. Fig. 2 is a horizontal section of said hub, the binding nut and spring washer and showing the axle in plan. Fig. 3 is an elevation of my improved spring thrust washer and Fig. 4 is a plan or edge view.

Carriage wheels in traveling over pavements and rough country roads are often subjected to severe shocks or blows which tend to move said wheels lengthwise of the axles about which they revolve. If such endwise movement is allowed unrestrained action an unpleasant rattle of the wheel will result, and if not permitted at all there is great danger of the axle becoming sprung or bent out of line. Attempts have been made to overcome this difficulty by using leather washers between the outer end of the hub of the wheel and the nut on the end of the axle, but the leather being non elastic if fitted closely to the end of the hub does not allow sufficient give when the wheel receives a blow tending to move it lengthwise of the axle and soon becomes so worn as to permit a too free movement of the wheel lengthwise of the axle and only partially remedies the rattling of the wheel. Rubber cushions have been used to some extent for this purpose with considerable success, but as said cushions or rubber rings surround the axle box between it and the wooden hub it is found to be an expensive construction. To obviate this difficulty in a comparatively inexpensive and an effective way I place upon the outer end of the axle between the end of the hub box and the nut for securing the wheel thereon a coiled steel spring of the form shown and which will now be described in connection with an explanation of the accompanying drawings, in which—

A represents a portion of a carriage axle of ordinary construction and B the hub of a carriage wheel fitted to revolve thereon in a well known manner. The axle A has its outer end turned down to a smaller diameter than the portion which fits within the hub box B', to form the shoulder *a* at a point a short distance say from one-fourth to three-eighths of an inch outside of the outer end of the hub box in a well known manner, the reduced portion of said axle having a male screw thread formed thereon to receive the nut C which is screwed up solid against the shoulder *a* and is provided on its inner face with the annular lip *b* in a well known manner.

D is an annular steel spring formed of two and one quarter, more or less, spiral coils of a rectangular bar of steel the two end portions of said bar being tapered to a thin knife edge and brazed or welded to the side of the contiguous coil so that the two faces of said spring washer which are at right angles to the axis of its coil shall be parallel to each other and present a continuous smooth annular surface to bear against the end of the hub box and the inner face of the nut all as shown in Figs. 2, 3, and 4. This spring washer D is made to fit closely the periphery of the axle just inside the shoulder *a* and is slightly compressed between the nut C and the outer end of the hub box B' as shown in Fig. 2. By this construction and arrangement of the spring washer D the hub of the wheel is always maintained in contact with the inner shoulder *c* of the axle except when the wheel receives a blow tending to move said hub outward on its axle when the spring washer will yield slightly to relieve the strain upon the axle and thus prevent the springing of the axle, and then the reaction of said spring washer will immediately cause said hub to assume its normal position again.

My invention may also be used to good advantage in connection with loose pulleys or revolving shafts which are subjected to endwise strains or shocks tending to move them in the direction of their lengths, which condition may be illustrated by the drawings in which the axle A would represent the shaft and the hub B B' the hanger or bearing for said shaft.

What I claim as new, and desire to secure by Letters Patent of the United States, is—

1. The spring washer D comprising a single bar or rod of steel formed into a plurality of spiral coils, the end portions of the bar or rod from which said coils are formed being tapered to a thin knife edge and brazed or welded to the face of the contiguous coil.

2. In combination with a revolving wheel or shaft, and its bearing, the spring washer D comprising a single bar or rod of steel formed into a plurality of spiral coils, the ends of said coils being brazed or welded to the surface of the intermediate or contiguous coil; and the nut C, said washer being fitted closely around said shaft or bearing between said nut and the end of the hub of said wheel or bearing for said shaft.

3. In combination with a carriage wheel, and its axle provided with a nut to secure said wheel thereon, the spring washer D comprising a single bar or rod of steel formed into a plurality of spiral coils, the ends of the bar or rod from which said coils are formed being tapered to a thin knife edge and brazed or welded to the intermediate or contiguous coil, and surrounding said axle between said nut and the wheel hub.

In testimony whereof I have signed my name to this specification, in the presence of two subscribing witnesses, on this 2d day of October, A. D. 1893.

JAMES S. CHACE.

Witnesses:
N. C. LOMBARD,
J. T. MURRAY.